US010990313B2

United States Patent
Kikuchi et al.

(10) Patent No.: US 10,990,313 B2
(45) Date of Patent: Apr. 27, 2021

(54) MULTI-STORAGE NODE SYSTEM AND CAPACITY MANAGEMENT METHOD OF MULTI-STORAGE NODE SYSTEM

(71) Applicant: Hitachi, Ltd., Tokyo (JP)

(72) Inventors: Akihiro Kikuchi, Tokyo (JP); Takayuki Fukatani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/563,724

(22) Filed: Sep. 6, 2019

(65) Prior Publication Data
US 2020/0264794 A1    Aug. 20, 2020

(30) Foreign Application Priority Data
Feb. 14, 2019   (JP) ............................. JP2019-024772

(51) Int. Cl.
*G06F 3/06* (2006.01)
*G06F 11/07* (2006.01)

(52) U.S. Cl.
CPC .......... *G06F 3/0644* (2013.01); *G06F 3/0604* (2013.01); *G06F 3/067* (2013.01); *G06F 3/0631* (2013.01); *G06F 3/0659* (2013.01)

(58) Field of Classification Search
None
See application file for complete search history.

(56) References Cited

U.S. PATENT DOCUMENTS

| 10,282,136 | B1* | 5/2019 | Ito ....................... G06F 11/2094 |
| 2003/0182312 | A1* | 9/2003 | Chen ..................... G06F 16/128 |
| 2005/0144173 | A1 | 6/2005 | Yamamoto et al. |

FOREIGN PATENT DOCUMENTS

| JP | 2005-165702 A | 6/2005 |
| JP | 2012-523594 A | 10/2012 |

* cited by examiner

*Primary Examiner* — Michael Alsip
(74) *Attorney, Agent, or Firm* — Procopio, Cory, Hargreaves & Savitch LLP

(57) ABSTRACT

In a multi-storage node system including a plurality of storage nodes, a plurality of storage nodes include a plurality of drives that store data and a control unit that controls writing of data to the drives. The control unit divides storage areas of the plurality of drives into a plurality of physical chunks, allocates the divided physical chunks to logical chunks, and stores data. A plurality of storage nodes are divided into fault sets affected by a single failure and manage the multi-storage node system. The control unit of one primary node that manages the multi-storage node system among a plurality of storage nodes includes a database for managing allocation of the physical chunks of a plurality of storage nodes to the logical chunks for each drive, each storage node, or for each fault set.

13 Claims, 15 Drawing Sheets

Fig. 5

STORAGE NODE MANAGEMENT TABLE 401

| NODE # | FAULT SET # |
|---|---|
| 1 | 1 |
| 2 | 1 |
| 3 | 2 |
| 4 | 2 |
| 5 | 3 |
| 6 | 3 |
| . . . | . . . |

Fig. 6

DRIVE MANAGEMENT TABLE 402

| DRIVE # | NODE # | NUMBER OF PHYSICAL CHUNKS (SUM) | NUMBER OF PHYSICAL CHUNKS (ALLOCATED) | NUMBER OF PHYSICAL CHUNKS (FREE) | MEDIUM TYPE |
|---|---|---|---|---|---|
| 1 | 1 | 10 | 5 | 5 | SSD |
| 2 | 1 | 20 | 5 | 15 | SAS |
| 3 | 1 | 10 | 3 | 7 | SATA |
| 4 | 2 | 10 | 10 | 0 | SSD |
| 5 | 2 | 10 | 5 | 5 | SAS |
| 6 | 2 | 20 | 15 | 5 | SATA |
| . . . | . . . | . . . | . . . | . . . | . . . |

Fig. 7

PHYSICAL CHUNK MANAGEMENT TABLE 403

| PHYSICAL CHUNK # | DRIVE # | INTRA-DRIVE OFFSET | STATUS |
|---|---|---|---|
| 1 | 1 | 0x00000 | Allocated |
| 2 | 1 | 0x10000 | Allocated |
| 3 | 1 | 0x20000 | Reserved |
| 4 | 1 | 0x40000 | Non-allocated |
| 5 | 2 | 0x00000 | Blockade |
| 6 | 2 | 0x10000 | Blockade |
| ... | ... | ... | ... |

LOGICAL CHUNK MANAGEMENT TABLE 404

| LOGICAL CHUNK # | DP-Pool # | PHYS. CHUNK # (MASTER) | PHYS. CHUNK # (MIRROR) |
|---|---|---|---|
| 1 | 1 | 1 | 5 |
| 2 | 1 | 2 | 6 |
| 3 | 2 | 3 | 7 |
| 4 | 2 | 10 | 4 |
| ... | ... | ... | ... |

ALLOCATED PHYSICAL CHUNK (NODE) MANAGEMENT TABLE 405

| NODE # | PAIR DESTINATION FAULT SET # | NUMBER OF ALLOCATED CHUNKS (SUM) | NUMBER OF ALLOCATED CHUNKS (SSD) | NUMBER OF ALLOCATED CHUNKS (SAS) | NUMBER OF ALLOCATED CHUNKS (SATA) |
|---|---|---|---|---|---|
| 1 | 2 | 20 | 10 | 5 | 5 |
| 1 | 3 | 30 | 5 | 10 | 15 |
| 2 | 2 | 30 | 10 | 10 | 10 |
| 2 | 3 | 40 | 20 | 20 | 0 |
| 3 | 1 | 30 | 30 | 0 | 0 |
| 3 | 3 | 40 | 20 | 10 | 10 |
| . . . | . . . | . . . | . . . | . . . | . . . |

FREE PHYSICAL CHUNK (NODE) MANAGEMENT TABLE 406

| NODE # | NUMBER OF FREE PHYSICAL CHUNKS (SUM) | NUMBER OF FREE PHYSICAL CHUNKS (SSD) | NUMBER OF FREE PHYSICAL CHUNKS (SAS) | NUMBER OF FREE PHYSICAL CHUNKS (SATA) |
|---|---|---|---|---|
| 1 | 30 | 10 | 10 | 10 |
| 2 | 40 | 30 | 10 | 0 |
| 3 | 30 | 5 | 5 | 20 |
| . . . | . . . | . . . | . . . | . . . |

ALLOCATED PHYSICAL CHUNK (FAULT SET) MANAGEMENT TABLE 407

| FAULT SET # | PAIR DESTINATION FAULT SET # | NUMBER OF ALLOCATED CHUNKS (SUM) | NUMBER OF ALLOCATED CHUNKS (SSD) | NUMBER OF ALLOCATED CHUNKS (SAS) | NUMBER OF ALLOCATED CHUNKS (SATA) |
|---|---|---|---|---|---|
| 1 | 2 | 20 | 10 | 5 | 5 |
| 1 | 3 | 30 | 5 | 10 | 15 |
| 2 | 2 | 30 | 10 | 10 | 10 |
| 2 | 3 | 40 | 20 | 20 | 0 |
| 3 | 1 | 30 | 30 | 0 | 0 |
| 3 | 3 | 40 | 20 | 10 | 10 |
| ... | ... | ... | ... | ... | ... |

Columns: 1101, 1102, 1103, 1104, 1105, 1106

Fig. 12

FREE PHYSICAL CHUNK (FAULT SET) MANAGEMENT TABLE 408

| FAULT SET # | NUMBER OF FREE PHYSICAL CHUNKS (SUM) | NUMBER OF FREE PHYSICAL CHUNKS (SSD) | NUMBER OF FREE PHYSICAL CHUNKS (SAS) | NUMBER OF FREE PHYSICAL CHUNKS (SATA) |
|---|---|---|---|---|
| 1 | 30 | 10 | 10 | 10 |
| 2 | 40 | 30 | 10 | 0 |
| 3 | 30 | 5 | 5 | 20 |
| ... | ... | ... | ... | ... |

Columns: 1201, 1202, 1203, 1204, 1205

Fig. 17A

ALERT (1)
- PLEASE ADD <u>DRIVE</u> WHOSE PHYSICAL CAPACITY SUM IS EQUAL TO OR LARGER THAN "b - (a - c)" TO <u>NODE OF NODE NUMBER n</u>.
- I/O PERFORMANCE IS LIKELY TO DEGRADE AS COMPARED WITH NORMAL TIMES AT TIME OF DATA REBUILDING BY REMOVAL OR FAILURE SIGN DETECTION OF DRIVE IN NODE WITH NODE NUMBER n.

Fig. 17B

ALERT (2)
- PLEASE ADD NODE OR DRIVE WHOSE PHYSICAL CAPACITY SUM IS EQUAL TO OR LARGER THAN "a - (c - b)" TO <u>FAULT SET OF FAULT SET NUMBER f</u>.
- OR PLEASE ADD <u>NODE</u> OR <u>DRIVE</u> WHOSE PHYSICAL CAPACITY SUM IS EQUAL TO OR LARGER THAN "d - e" TO <u>FAULT SET OF FAULT SET NUMBER OTHER THAN FAULT SET NUMBERS f AND p.</u>
- WHEN NODE OF NODE NUMBER n IS BLOCKADED, DATA OF NODE MAY NOT BE ABLE TO BE REBUILT.

Fig. 17C

ALERT (3)
- PLEASE ADD <u>NODE</u> OR <u>DRIVE</u> WHOSE PHYSICAL CAPACITY SUM IS EQUAL TO OR LARGER THAN "a - b" TO <u>FAULT SET OF FAULT SET NUMBER OTHER THAN FAULT SET NUMBERS f AND p.</u>
- WHEN FAULT SET OF FAULT SET NUMBER f IS BLOCKADED, DATA OF FAULT SET MAY NOT BE ABLE TO BE REBUILT.

MULTI-STORAGE NODE SYSTEM AND
CAPACITY MANAGEMENT METHOD OF
MULTI-STORAGE NODE SYSTEM

BACKGROUND OF THE INVENTION

1. Field of the Invention

The present invention relates to a multi-storage node system and a capacity management method of a multi-storage node system.

2. Description of the Related Art

In recent years, a software defined storage (SDS) which is a technique for managing storage devices distributed to a plurality of nodes with software and defining all of them as a large storage device to thereby improve usage efficiency has become widespread.

In such a system in which storage areas are distributed to a plurality of nodes, it is very important to manage a free capacity of the entire system. As a technique for managing the free capacity of the system distributed to a plurality of nodes, there is a technique disclosed in JP 2005-165702 A.

A technique of connecting storage areas distributed to a plurality of nodes and causing a host computer to access them as a single storage area is disclosed in JP 2005-165702 A.

In a multi-storage system including a plurality of nodes such as an SDS, data is made redundant by applying a Mirroring or Erasure-Coding technique of storing data in drives of a plurality of nodes.

In a general SDS, data rebuilding is performed to recover the redundancy of stored data when a node or a drive installed in a node has a failure, when a node or a drive is removed, or when a sign of a drive failure is detected. For example, when a drive failure occurs, data stored in a drive in which a failure has occurred is rebuilt in other drives in the multi-storage system, so that the data redundancy is secured in the multi-storage system.

In order to perform the data rebuilding to recover the data redundancy, redundant data needs to be present in a system including a plurality of nodes when a drive or node failure occurs or when a node or a drive is removed, and a physical capacity to rebuild and store data from the redundant data is necessary.

However, although the technique of connecting the storage areas distributed to a plurality of nodes and managing the free capacity as a single storage area is disclosed in JP 2005-165702 A, it is to determine whether or not there is a free capacity in a storage adapter (SA) when a physical device is allocated to a logical device, and detection of the free capacity for the data rebuilding is not mentioned.

Also, managing the capacity in units of drives installed in a node, in units of nodes or units of fault sets in which a plurality of nodes are defined as a fault set for the data rebuilding in an SDS environment is not mentioned.

SUMMARY OF THE INVENTION

In this regard, it is an object of the present invention to provide a multi-storage node system and a capacity management method of a multi-storage node system which are capable of securing the capacity for the data rebuilding in order to secure the data redundancy in the multi-storage node system.

In order to achieve the above objects, a multi-storage node system according to one aspect of the present invention includes a plurality of storage nodes. A plurality of storage nodes include a plurality of drives that store data and a control unit that controls writing of data to the drives. The control unit divides storage areas of the plurality of drives into a plurality of physical chunks, allocates the divided physical chunks to logical chunks, and stores data. A plurality of storage nodes are divided into fault sets affected by a single failure, and the control unit of one primary node that manages the multi-storage node system among a plurality of storage nodes includes a database for managing allocation of the physical chunks of a plurality of storage nodes to the logical chunks for each drive, each storage node, or for each fault set.

According to the present invention, it is possible to perform the capacity management for the data rebuilding in units of drives, in units of nodes, or in units of fault sets in order to secure the data redundancy even when a drive or node has a failure or when a drive or a node is removed in a multi-storage node system.

BRIEF DESCRIPTION OF THE DRAWINGS

FIG. 5 is a diagram illustrating an example of a storage node management table of the present embodiment;

FIG. 6 is a diagram illustrating an example of a drive management table of the present embodiment;

FIG. 7 is a diagram illustrating an example of a physical chunk management table of the present embodiment;

FIG. 8 is a diagram illustrating an example of a logical chunk management table of the present embodiment;

FIG. 9 is a diagram illustrating an example of an allocated physical chunk (node) management table of the present embodiment;

FIG. 10 is a diagram illustrating an example of a free physical chunk (node) management table of the present embodiment;

FIG. 11 is a diagram illustrating an example of an allocated physical chunk (fault set) management table of the present embodiment;

FIG. 12 is a diagram illustrating an example of a free physical chunk (fault set) management table of the present embodiment;

FIG. 17A is a diagram illustrating an example of an alert (1) according to the notification condition (1) of the present embodiment;

FIG. 17B is a diagram illustrating an example of an alert (2) according to the notification condition (2) of the present embodiment;

FIG. 17C is a diagram illustrating an example of an alert (3) according to the notification condition (3) of the present embodiment;

DETAILED DESCRIPTION OF THE PREFERRED EMBODIMENTS

Figure 1:
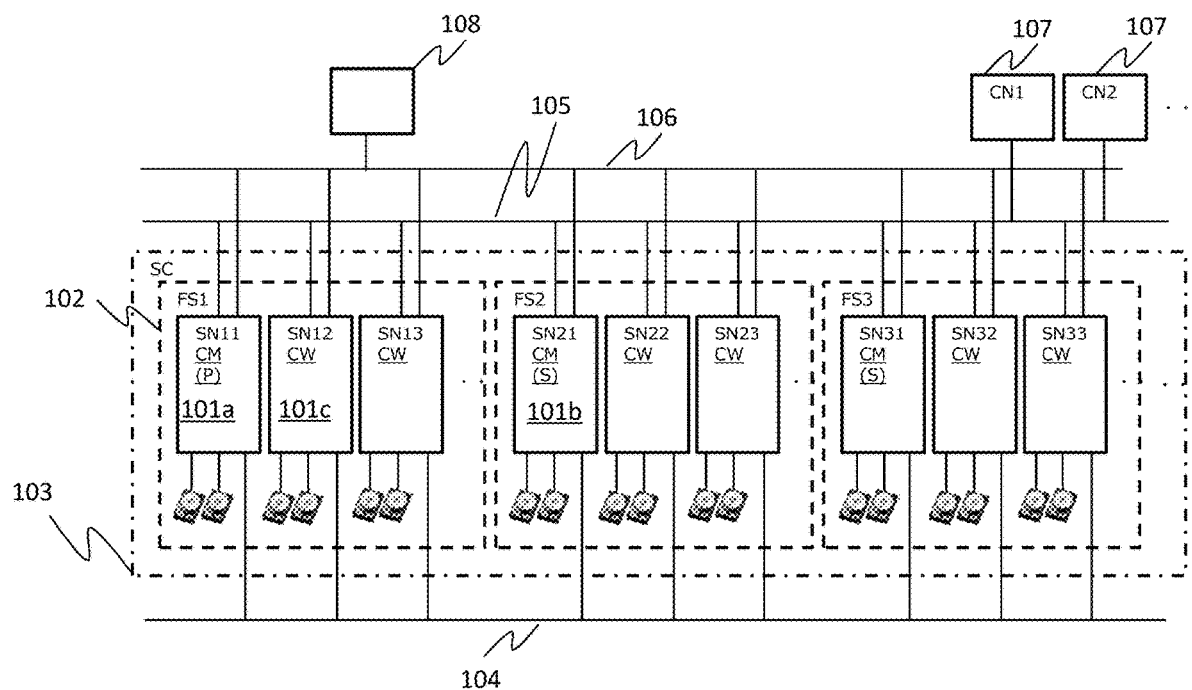
FIG. 1 is a diagram illustrating an example of a system configuration of the present embodiment.

An exemplary embodiment will be described with reference to the appended drawings. Note that an embodiment to be described below does not limit the invention related to claims set forth below, and all of elements described in an embodiment and combinations thereof are not intended to be essential for the solutions of the invention.

In the following description, there are cases in which information is described by an expression "AAA table", but information may be expressed by any data structure. That is, the "AAA table" can be written as "AAA information" to indicate that information does not depend on a data structure.

Also, in the following description, a "CPU" is a central processing unit that includes one or more processors. The processor may include a hardware circuitry that performs some or all of processes.

Also, in the following description, the process in which a "program" is described an entity of an operation may be mentioned in some cases, but since the program is executed by a CPU to perform a predetermined process while using a storage resource (for example, a memory) or the like appropriately, an actual entity of the process is a CPU. Therefore, the process in which the program is described as the entity of the operation may be a process performed by a processor. Further, a hardware circuitry that performs some or all of processes performed by the processor may be included. A computer program may be installed in a device from a program source. The program source may be, for example, a program distribution server or a computer readable storage medium.

<Overview>

In the present technology, it is necessary to secure the capacity for the data rebuilding in an appropriate place (a fault set or a node) in advance in a software defined storage (SDS) even when a failure occurs in units of fault sets having a plurality of nodes as units, in units of nodes, or in units of drives installed in each node or a node or a drive is removed in a multi-storage node system. Also, in the SDS, it is necessary to reduce influence on I/O performance at the time of data rebuilding. Here, the fault set means, for example, a group in which nodes supplied with power by the same power system are collected or a group in which nodes connected to a network by the same switch are collected and refers to a group of nodes which are affected by a single failure. In other words, the fault set is a group of nodes configured so that redundant data can be present in a multi-storage node system even when a power failure or a switch failure occurs.

As described above, in the multi-storage node system in which a plurality of nodes are grouped by the concept of the fault set, it is very difficult for an administrator to determine an appropriate place for rebuilding data (the fault set or the node), that is, a place in which a physical capacity for storing rebuilding data has to be secured.

The present technology relates to a multi-storage node system and a capacity management method of a multi-storage node system which are capable of performing capacity management for performing data rebuilding in units of drives, in units of nodes, or in units of fault sets and detecting a storage destination of rebuilding data in a drive, a node, or a fault set in order to secure the data redundancy even when a drive or a node has a failure or when a drive or a node is removed in a multi-storage node system.

Description of Terminology

A storage cluster (SC): a storage cluster corresponds to the entire multi-storage node system.

A fault set (FS): a fault set is a subset of a storage cluster and is a group of storage nodes affected by a single failure. For example, the fault set is a group of nodes sharing a power supply system or a network switch and is a group of nodes affected by a power failure or a network switch failure. In order to secure the data redundancy even when a single power failure occurs, the redundant data needs to be present on other fault sets on the storage cluster.

A storage node (SN): a storage node.

A cluster master (primary) (CM (P)): a cluster master (primary) is a storage node that manages the entire multi-storage node system, and one cluster master (primary) is present in the multi-storage node system. The cluster master (primary) is called a primary node.

A cluster master (secondary) (CM (S)): a cluster master (secondary) is a standby system node of the cluster master (primary) and is promoted to the cluster master (primary) when a failure occurs in the cluster master (primary).

A cluster worker (CW): a cluster worker. A storage node other than the cluster master (primary and secondary).

A compute node (CN): a computer node. A computer node in which an application for accessing data stored in the storage node operates.

A management node (MN): a management node. A node that manages the storage cluster.

<System Configuration>

First, a multi-storage node system according to an embodiment of the present invention will be described.

FIG. 1 is a system configuration diagram of an embodiment.

A plurality of storage nodes (SNs) 101a, 101b, and 101c include a drive for storing data and are connected to one another via an inter-storage node network 104.

One or more computer nodes (CNs) 107 include an application operating therein and are connected to a plurality of storage nodes 101 via a computer network 105. A plurality of storage nodes 101 receive an IO request from the computer node 107, store data in the drive, read out data, and transmit the data to the computer node.

A plurality of storage nodes 101 are connected, via a management network 106, to a management node (MN) 108 that manages a plurality of storage nodes 101.

A plurality of storage nodes 101 form a storage cluster (SC) 103, and the storage cluster 103 corresponds to the multi-storage node system and constitutes a fault set 102 which is a group of storage nodes sharing a power supply system or a network switch as a subset.

Two or more fault sets can be configured in the storage cluster 103, and about three fault sets are assumed in the present embodiment. Each fault set can be constituted by one or more storage nodes. In the present embodiment, a maximum of about 16 storage nodes are assumed. Here, the number of drives installed in each node 101 is two or more, and a maximum of about 26 drives are assumed in the present embodiment. The number of units is not limited to the illustrated example, and an appropriate number can be assumed without departing from the scope of the present invention.

A plurality of storage nodes 101 manage the storage clusters and include one cluster master (primary) (CM (P)) 101a existing in the storage cluster, a cluster master (secondary) (CM (S)) 101b serving as a standby system of the cluster master (primary), and a cluster workers (CW) 101c.

Figure 2:
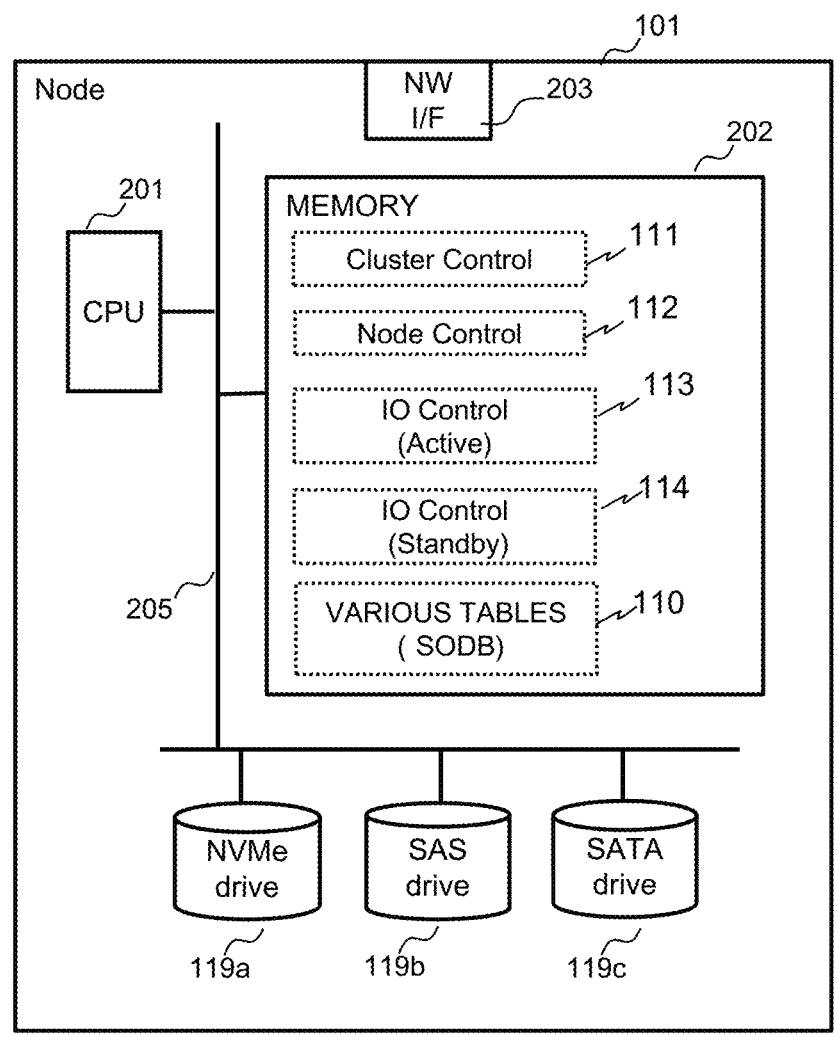
FIG. 2 is a diagram illustrating an example of a hardware configuration diagram of a storage node of the present embodiment.

FIG. 2 is a diagram illustrating an example of a hardware configuration diagram of a storage node according to an embodiment.

A storage node 101 corresponds to the storage nodes 101a, 1011b, or the like in FIG. 1, and performs a process of processing an I/O request from a computer such as a server, storing data in a drive 119 or reading data from the drive 119, and transmitting the data to the computer node 107. The drive 119 includes various types of drives such as an NVMe drive 119a, an SAS drive 119b, and a SATA drive 119c.

The storage node 101 includes a network interface 203 for connecting to the inter-storage node network 104, the computer network 105, and the management network 106, one or more central processing units (CPUs) 201, a memory 202, and a bus 205 which connects them. The memory 202 is includes a volatile memory such as an SRAM or a DRAM.

The memory 202 stores a cluster control program 111 for constituting a cluster with a plurality of storage nodes, a node control program 112 for controlling the storage node, and an IO control active (program) 113 that processes an IO request from the computer node 107 and controls writing of data to the drive 119 and reading of data from the drive 119. The memory 202 further stores various types of tables illustrated in FIG. 4 in a scale out data base (SODB) 110 in addition to an IO control standby 114 of a standby system for the IO control active program of another storage node serving as the cluster master (primary).

The CPU 201 realizes various types of functions as a control unit by executing a program stored in the memory 202.

In addition to the illustrated programs, various types of programs such as snapshot and remote functions are stored in the memory 202 and function as the storage node. Also, the memory 202 has a cache area serving as a cache memory for temporarily storing data related to the IO request.

The cluster control program 111, the node control program 112, the IO control active 113, and the IO control standby 114 may be stored in the drive 119, read onto the memory 202 by the CPU 201, and operated. The functions realized by executing various types of programs are also referred to as a cluster control unit 111, a node control unit 112, an IO control unit active 113, and an IO control unit standby 114.

A network interface NW I/F 303 is illustrated as one interface for the sake of convenience, but an interface for connecting with the inter-storage node network 104 for connecting with another storage node, the computer network 105 for connecting with the computer node 107, and the management network 106 for connecting with the management node 108 may be configured with two or more separate interfaces.

The configuration of the storage node is common to the cluster master (primary) (CM (P)) 101a, the cluster master (secondary) (CM (S)) 101b, and the cluster worker (CW) 101c.

Figure 3:
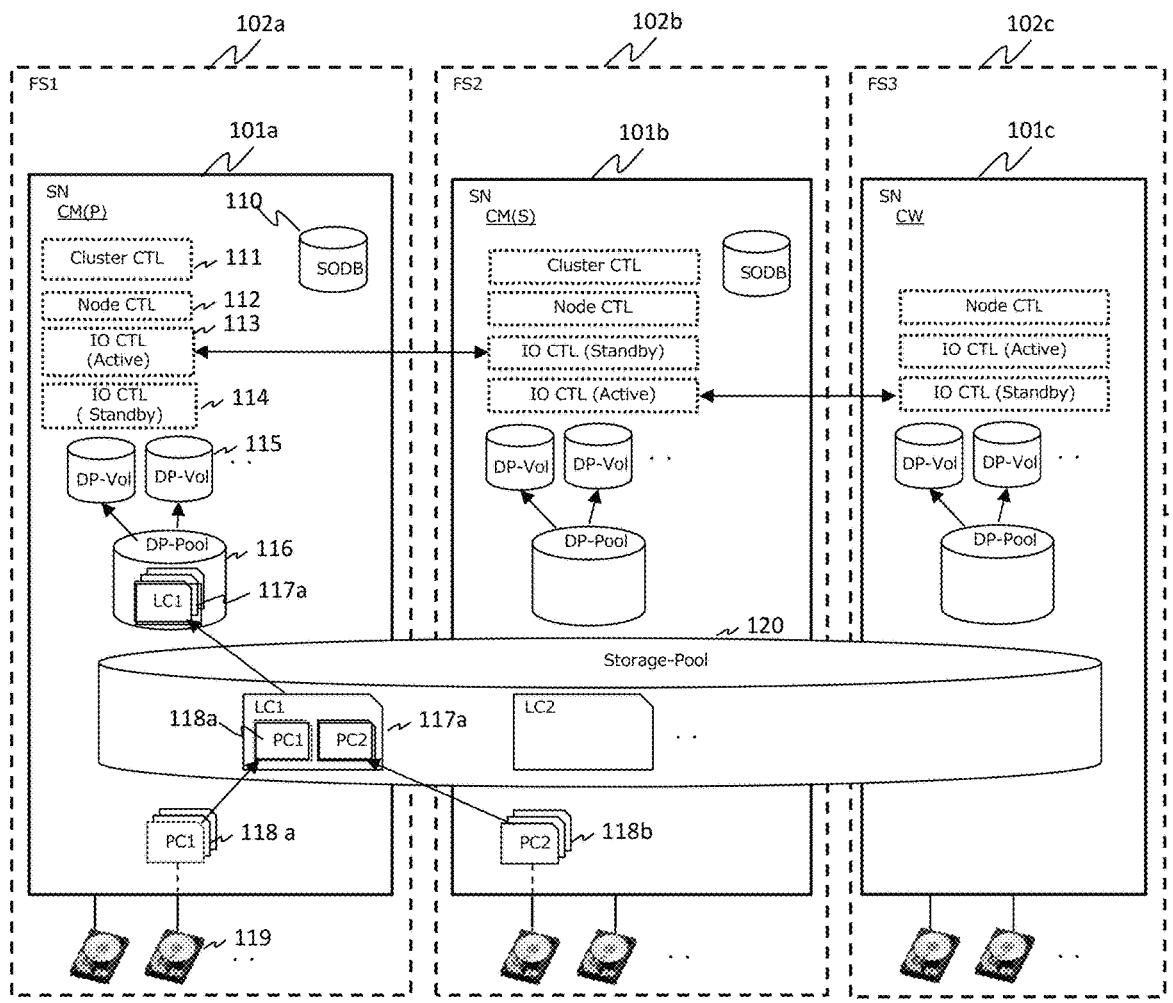
FIG. 3 is a system block diagram illustrating an example of positioning of a volume between a control unit and a storage node of the present embodiment.

FIG. 3 is a system block diagram illustrating an example of positioning of a volume between the control unit and the storage node realized by the CPU 201 according to an embodiment.

The storage node 101a is a node operating as the cluster master primary (primary node), the storage node 101b is a node operating as the cluster master secondary, and the storage node 101c is a node operating as the cluster worker. Each storage node 101 stores the programs illustrated in FIG. 2, but in FIG. 3, only programs necessary for description of the operation are illustrated and described. Further, FIG. 3 illustrates an example in which each fault set includes one storage node in order to simplify the description, but one fault set may include a plurality of storage nodes.

Each storage node manages a plurality of physical chunks 118a and 118b using a storage area of a fixed size of the drive 119 as a management unit. The primary node 101a allocates a plurality of physical chunks 118 and 118b from each storage node to a logical chunk (LC) LC1 117a. The control unit of the primary node constitutes a storage pool 120 including a plurality of logical chunks LC 117.

The control unit 201 of the primary node configures a DP pool by allocating a plurality of logical chunks including the logical chunk 117a of the storage pool 120 to a DP pool 116. The control unit 201 provides the computer node 107 with one or more DP volumes 115 as a storage area. The control unit 201 allocates a storage area from the DP pool 116 to the DP volume 115.

FIG. 3 schematically illustrates a relation between the drive 119 and the physical chunk 118, a relation between the physical chunk 118 and the logical chunk 117, a relation between the logical chunk 117 and the storage pool 120, a relation among the logical chunk 117, the storage pool 120, and the DP pool 116, and a relation between the DP pool 116 and the DP volume 115.

Further, in FIG. 3, the IO control active 113 of the primary node 101a and the IO control standby (program) of the cluster master secondary 101b constitute an active system and a standby system for a certain DP volume. On the other hand, a relation in which, for other DP volumes, the storage node 101b serves as the IO control active, and the storage node 101c serves as the IO control standby is illustrated.

<Various Types of Tables>

Figure 4:
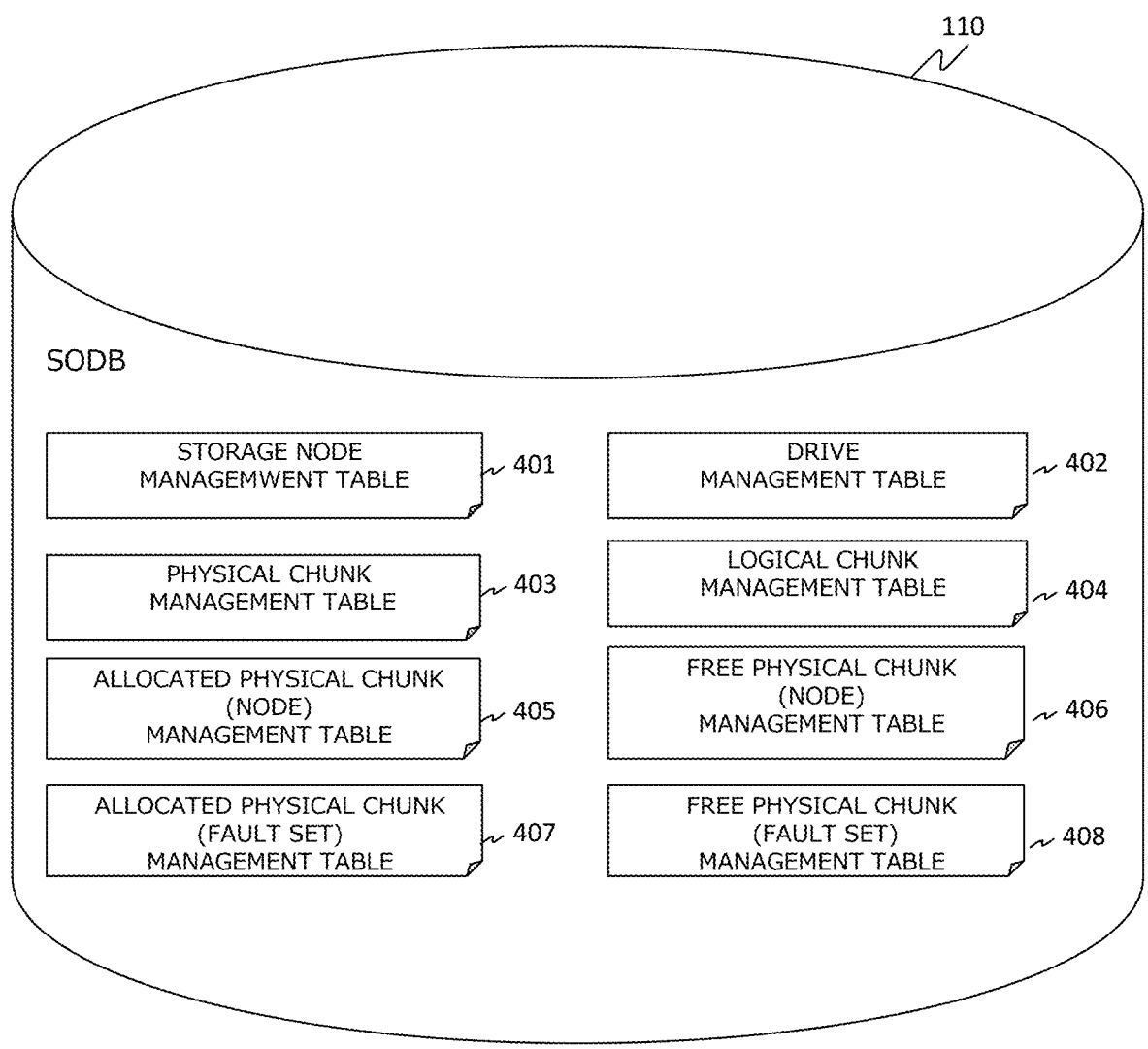
FIG. 4 is a diagram illustrating an example of various types of management tables of the present embodiment.

FIG. 4 is a diagram illustrating an example of various types of management tables of the present embodiment.

The SODB 110 stores various types of tables such as a storage node management table 401, a drive management table 402, a physical chunk management table 403, a logical chunk management table 404, an allocated physical chunk (node) management table 405, a free physical chunk (node) management table 406, an allocated physical chunk (fault set) management table 407, and a free physical chunk (fault set) management table 408.

The detailed storage node management table 401 is illustrated in FIG. 5, the detailed drive management table 402 is illustrated in FIG. 6, the detailed physical chunk management table 403 is illustrated in FIG. 7, the detailed logical chunk management table 404 is illustrated in FIG. 8, the detailed allocated physical chunk (node) management table 405 is illustrated in FIG. 9, the detailed free physical chunk (node) management table 406 is illustrated in FIG. 10, the detailed allocated physical chunk (fault set) management table 407 is illustrated in FIG. 11, and the detailed free physical chunk (fault set) management table 408 is illustrated in FIG. 12.

Further, although the description proceeds using an expression such as a table for the sake of convenience of explanation, it can realize by other data structures, such as a pointer or a relational database in addition to a table.

FIG. 5 is a diagram illustrating an example of the storage node management table of the present embodiment.

The storage node management table 401 is stored in the SODB 110. A node number 501 of the storage node management table 401 is an identifier uniquely identifying each storage node in the storage cluster. A fault set number is an identifier uniquely identifying each fault set in the storage cluster. For example, the storage node specified by the node number 501 "1" (hereinafter, also referred to simply as a "node") indicates that the node belongs to a fault set number 502 "1". Similarly, the node of the node number 501 "3" indicates that it belongs to the fault set number "2".

FIG. 6 is a diagram illustrating an example of the drive management table of the present embodiment.

The drive management table 402 is stored in the SODB 110. A drive number 601 is an identifier uniquely identifying each drive 119 in the storage cluster. A node number 602 is an identifier uniquely identifying each storage node in the storage cluster and corresponds to the node number 501 in FIG. 5. The number of physical chunks (sum) 603 represents the number of physical chunks included in the drive specified by the drive number. The number of physical chunks (allocated) 604 represents the number of allocated chunks allocated to the logical chunks among the physical chunks included in the drive specified by the drive number. The number of physical chunks (free) 605 represents the number of chunks not allocated to the logical chunks among the physical chunks included in the drive specified by the drive number. A medium type 606 is information indicating a type of drive specified by the drive number.

For example, the drive number 601 "2" belongs to the node number 602 "1", the number of physical chunks (sum) 603 is "20", the number of physical chunks (allocated) 604 is "5", the number of physical chunks (free) 605 is "15", and the medium type 606 is "SAS". The medium type is used as information for selecting a medium of the same type as a medium in which data is stored as a storage destination of rebuilt data at the time of data rebuilding.

FIG. 7 is a diagram illustrating an example of the physical chunk management table of the present embodiment.

The physical chunk management table 403 is stored in the SODB 110. A physical chunk number 701 in the physical chunk management table 403 is an identifier uniquely identifying each physical chunk 118 in the storage cluster 103. A drive number 702 is an identifier uniquely identifying each drive 119 in the storage cluster 103 and corresponds to the drive number 601 in FIG. 6. An intra-drive offset 703 indicates an address in the drive specified by the drive number of the physical chunk specified by each physical chunk number. A status 704 indicates whether or not the physical chunk identified by the physical chunk number 701 is allocated to the logical device. Here, the status 704 may store information indicating a status of Reserved which is a reserved status or a status of Blockade indicating a status in which the physical chunk is unable to be used in addition to allocation to the logical device.

For example, the physical chunk of the physical chunk number 701 "2" belongs to the drive of the drive number 702 "1", starts from a position of "0x10000", and indicates an "allocated" status is allocated.

FIG. 8 is a diagram illustrating an example of the logical chunk management table of the present embodiment.

The logical chunk management table 404 is stored in the SODB 110. A logical chunk number 801 of the logical chunk management table 404 is an identifier uniquely identifying each logical chunk 117 in the storage cluster 103. A DP pool number 802 is an identifier identifying a DP pool to which the logical chunk is allocated. A physical chunk number (master) 803 is an identifier identifying the physical chunk serving as the master among the physical chunks allocated to the logical chunks, and a physical chunk number (mirror) 804 is an identifier identifying the physical chunk serving as a mirror among the physical chunks allocated to the logical chunks.

For example, the logical chunk number 801 "2" is allocated to the DP pool number 802 "1", master data is stored in the physical chunk number 803 "2", and mirror data is stored in the physical chunk number 804 "6".

FIG. 8 illustrates the redundancy by mirroring in which two physical chunks, that is, the master and the mirror are allocated to one logical chunk, but in the case of the redundancy to which Erasure-Coding is applied, a column indicating a plurality of physical chunk numbers as the physical chunk number 803 in association with the data chunk is necessary, and a column of a physical chunk number indicating the physical chunk having a parity stored therein is also necessary.

FIG. 9 is a diagram illustrating an example of the allocated physical chunk (node) management table of the present embodiment. The physical chunk (node) management table 405 is stored in the SODB 110. A node number 901 of the physical chunk (node) management table 405 is an identifier uniquely identifying each storage node 101 in the storage cluster 103 and corresponds to the node number 501 of FIG. 5 and the node number 602 of FIG. 6. A pair destination fault set number 902 is an identifier identifying the fault set to which a node paired with each node belongs. The fault set is a group of nodes configured so that the redundant data can be presented in the a multi-storage node system even at the time of power failure, and the fault set storing the redundant data at the time of power failure or the like is stored as the pair destination fault set number 902.

The number of allocated chunks (sum) 903 indicates the sum of the number of allocated physical chunks in the node. The number of allocated chunks (SSD) 904 indicates the number of allocated physical chunks in the SSD drive of the node. The number of allocated chunks (SAS) 905 indicates the number of allocated physical chunks in the SAS drive of the node. The number of allocated chunks (SATA) 906 indicates the number of allocated physical chunks in the SATA drive of the node. Therefore, the value of the number of allocated chunks (sum) 903 is a value obtained by adding the numbers of allocated chunks 904, 905, and 906 of the respective drives.

For example, in the case of the node number 901 "1", the pair destination fault set number 902 is "2" and "3", and when the pair destination fault set number 902 is "2", the number of allocated chunks (sum) 903 is "20", the number of allocated chunks (SSD) 904 is "10", the number of allocated chunks (SAS) 905 is "5", and the number of allocated chunks (SATA) 906 is "5".

FIG. 10 is a diagram illustrating an example of the free physical chunk (node) management table of the present embodiment. The free physical chunk (node) management table 406 is stored in the SODB 110. A node number 1001 of the free physical chunk (node) management table 406 is an identifier uniquely identifying each storage node 101 in the storage cluster 103, and corresponds to the node number 501 of FIG. 5, the node number 602 of FIG. 6, and the node number 901 of FIG. 9.

The number of free physical chunks (sum) 1002 represents the sum of the number of unallocated physical chunks among the physical chunks included in the node specified by the node number. The number of free physical chunks (SSD) 1003 indicates the number of physical chunks not used for allocation in the SSD drive of the node. The number of free physical chunks (SAS) 1004 indicates the number of physical chunks not used for allocation by the SAS drive of the node. The number of free physical chunks (SATA) 1005 indicates the number of physical chunks not used for allocation in the SATA drive of the node. Therefore, the value of the number of free physical chunks (sum) 1002 is a value obtained by adding the numbers of free physical chunks 1003, 1004, and 1005 of the respective drives.

For example, in the case of the node number 1001 "1", the number of free physical chunks (sum) 1002 is "30", the number of free physical chunks (SSD) 1003 is "10", the number of free physical chunks (SAS) 1004 is "10", and the number of free physical chunks (SATA) 1005 is "10".

FIG. 11 is a diagram illustrating an example of the allocated physical chunk (fault set) management table of the present embodiment. The allocated physical chunk (fault set) management table 407 is stored in the SODB 110.

A fault set number 1101 of the allocated physical chunk (fault set) management table 407 is an identifier uniquely identifying each fault set 102 in the storage cluster 103. A pair destination fault set number 1102 is an identifier specifying a fault set which is paired with the fault set indicated by the fault set number 1101 and stores the redundant data.

The number of allocated chunks (sum) 1103 indicates the sum of the number of allocated physical chunks in the fault set. The number of allocated chunks (SSD) 1104 indicates the number of allocated physical chunks in the SSD drive in the fault set. The number of allocated chunks (SAS) 1105 indicates the number of allocated physical chunks in the SAS drive in the fault set. The number of allocated chunks (SATA) 1106 indicates the number of allocated physical chunks in the SATA drive in the fault set. Therefore, the value of the number of allocated chunks (sum) 1103 is a value obtained by adding the numbers of allocated physical chunks 1104, 1105, and 1106 of the respective drives.

For example, in the case of the fault set number 1101 "1", the pair destination fault set number 1102 is "2" and "3". When the pair destination fault set number 1102 is "2", the number of allocated chunks (sum) 1103 is "20", the number of allocated chunks (SSD) 1104 is "10", the number of allocated chunks (SAS) 1105 is "5", and the number of allocated chunks (SATA) 1106 is "5".

FIG. 12 is a diagram illustrating an example of the free physical chunk (fault set) management table of the present embodiment. The free physical chunk (fault set) management table 408 is stored in the SODB 110.

A fault set number 1201 of the free physical chunk (fault set) management table 408 is an identifier uniquely identifying each fault set 102 in the storage cluster 103 and corresponds to the fault set number 1101 of FIG. 11.

The number of free physical chunks (sum) 1202 represents the sum of the number of unallocated physical chunks among the physical chunks included in the fault set identified by the fault set number 1201. The number of free physical chunks (SSD) 1203 indicates the number of physical chunks not used for allocation in the SSD drive in the fault set. The number of free physical chunks (SAS) 1204 indicates the number of physical chunks not used for allocation by the SAS drive in the fault set. The number of free physical chunks (SATA) 1205 indicates the number of physical chunks not used for allocation in the SATA drive in the fault set. Therefore, the value of the number of free physical chunks (sum) 1202 is a value obtained by adding the numbers of free physical chunks 1203, 1204, and 1205 of the respective drives.

For example, in the case of the fault set number 1201 "1", the number of free physical chunks (sum) 1202 is "30", the number of free physical chunks (SSD) 1203 is "10", the number of free physical chunks (SAS) 1204 is "10", and the number of free physical chunks (SATA) 1205 is "10".

The identifiers indicated by the numbers such as the node numbers illustrated in FIG. 5 to FIG. 12 are not limited to numbers and may be other information such as a symbol or a character.

Here, the process of allocating the physical chunk 118, the logical chunk 117, and the DP pool 116 described in FIG. 3 will be described with reference to FIG. 19 using various types of management tables stored in the SODB 110.

Figure 19:
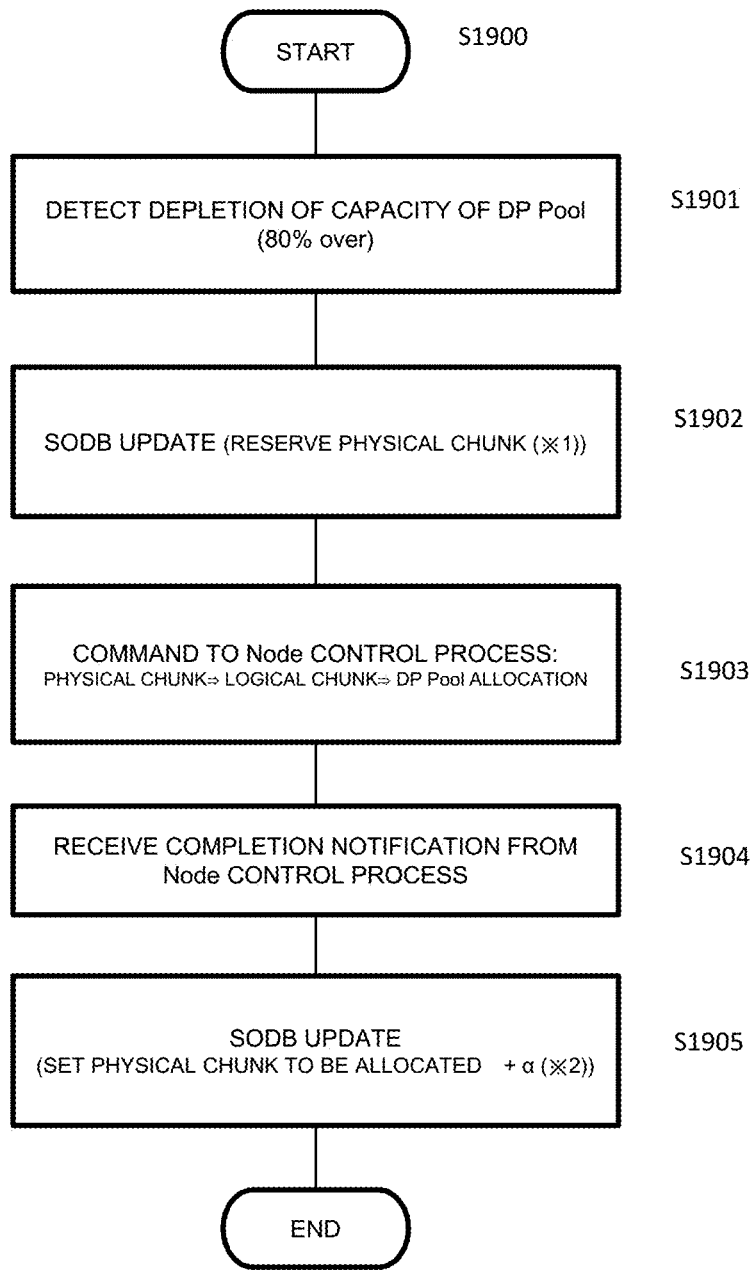
FIG. 19 is a flowchart illustrating a process of allocating a physical chunk to a DP pool according to the present embodiment.

FIG. 19 is a flowchart illustrating a process of allocating the physical chunk to the DP pool which is executed in the control unit 201. In step S1901, the depletion of the capacity of the DP pool 116 is detected. For example, when 80% of the capacity of the DP pool is allocated to the DP volume 115, the DP pool is determined to be depleted. However, 80% is just an example, and other values may be set.

In step S1902, the SODB is updated. Specifically, the status 704 of the physical chunk of Non allocated in the physical chunk management table 403 is changed from Non Allocated to Reserved.

In step S1903, the node control unit 112 allocates the physical chunk whose status is changed to "Reserved" in the logical chunk management table 404 of the SODB 110 to the logical chunk. The logical chunk to which the physical chunk is allocated is allocated to the DP pool.

In step S1904, the node control unit updates the SODB upon receiving a process completion notification. The SODB may be managed or updated by the cluster control unit 111. In this case, the cluster control unit 111 that has received the process completion notification from the node control unit updates the SODB.

For example, the value of the number of physical chunks (allocated) 604 of the drive management table 402 is increased, and the value of the number of physical chunks (free) 605 is decreased. The free physical chunk (node) management table 406, the allocated physical chunk (node) management table 405, the free physical chunk (fault set) management table 408, and the allocated physical chunk (fault set) management table 407 are similarly updated.

That is, in the present embodiment, the allocation of the physical chunk means either or both of allocation to a corresponding logical chunk or allocation to the DP pool.

<Control Flow>

Figure 13:
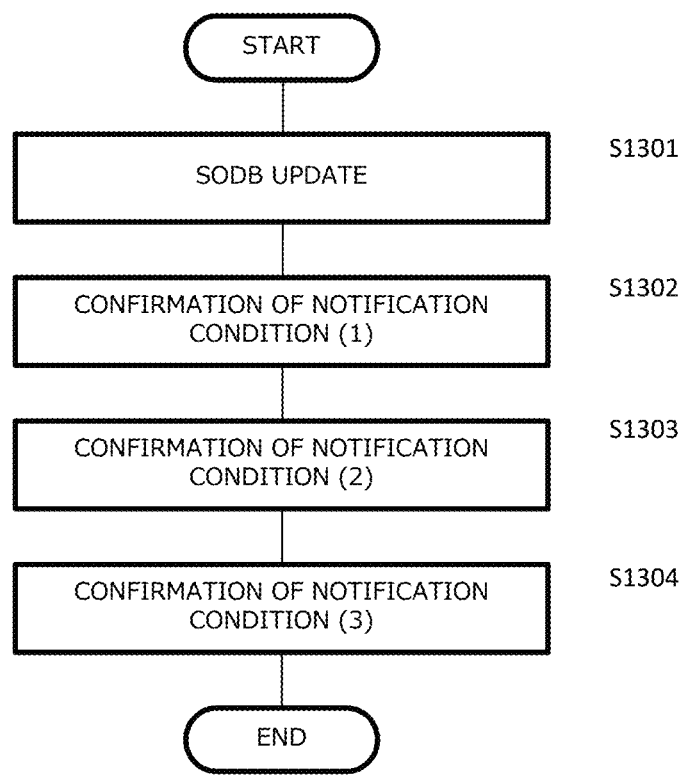
FIG. 13 is a flowchart illustrating a process flow of cluster control of the present embodiment.

FIG. 13 is a flowchart illustrating a process flow of the cluster control unit of the present embodiment. In a case in which there is a change in the configuration of the storage cluster, various types of management tables in the SODB 110 are updated (step S1301).

Various types of management tables in the SODB 110 are updated, for example, when the physical chunk is newly allocated due to the usage increase of the DP pool or rebalancing, when a failure in the fault set, a failure in the node, or a failure in the device is detected, when the physical chunk is disabled, when the drive is removed from each storage node, or when the storage node is removed from the storage cluster.

Figure 14:
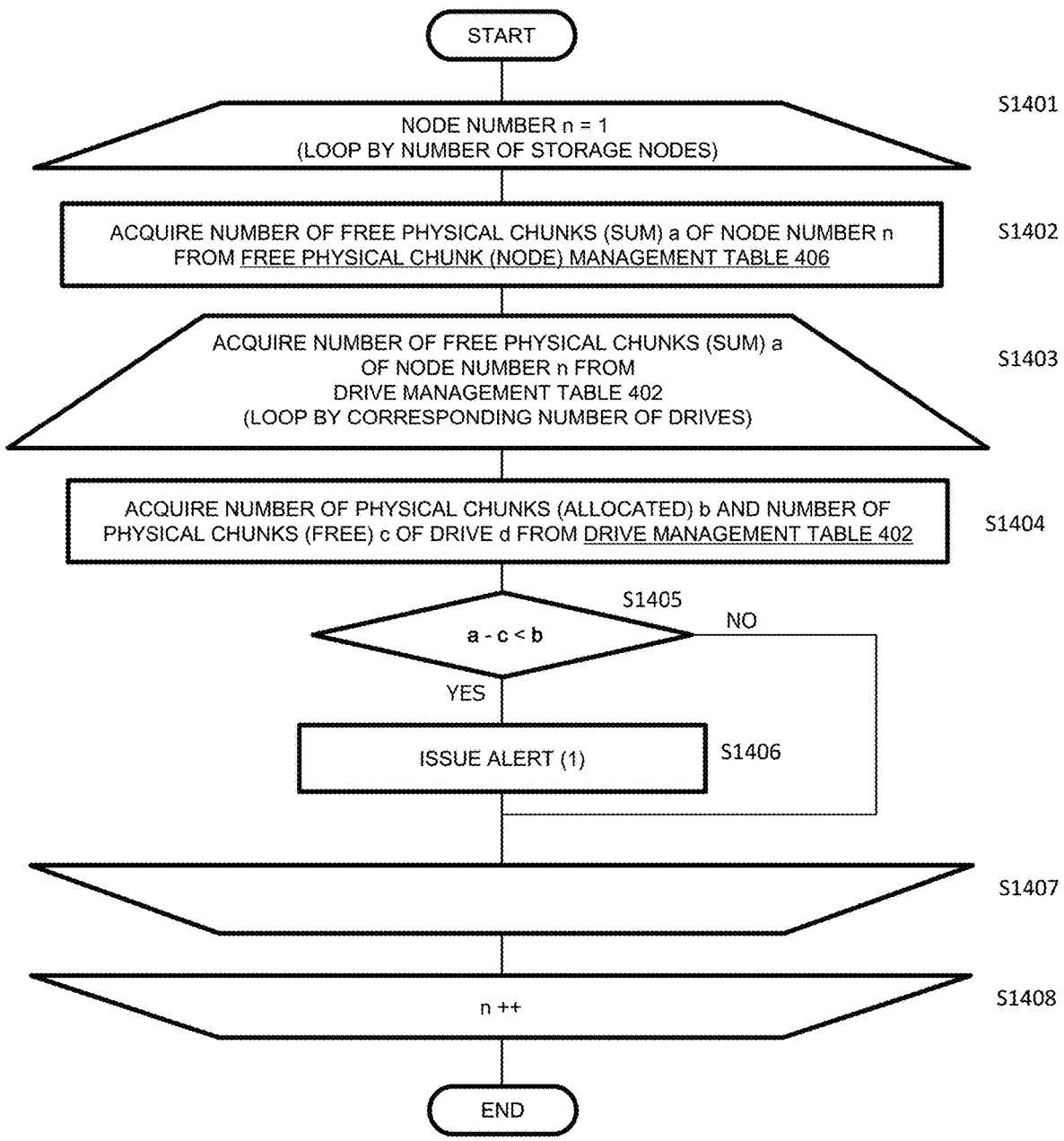
FIG. 14 is a flowchart illustrating a confirmation process flow of a notification condition (1) of the present embodiment.
Figure 15:
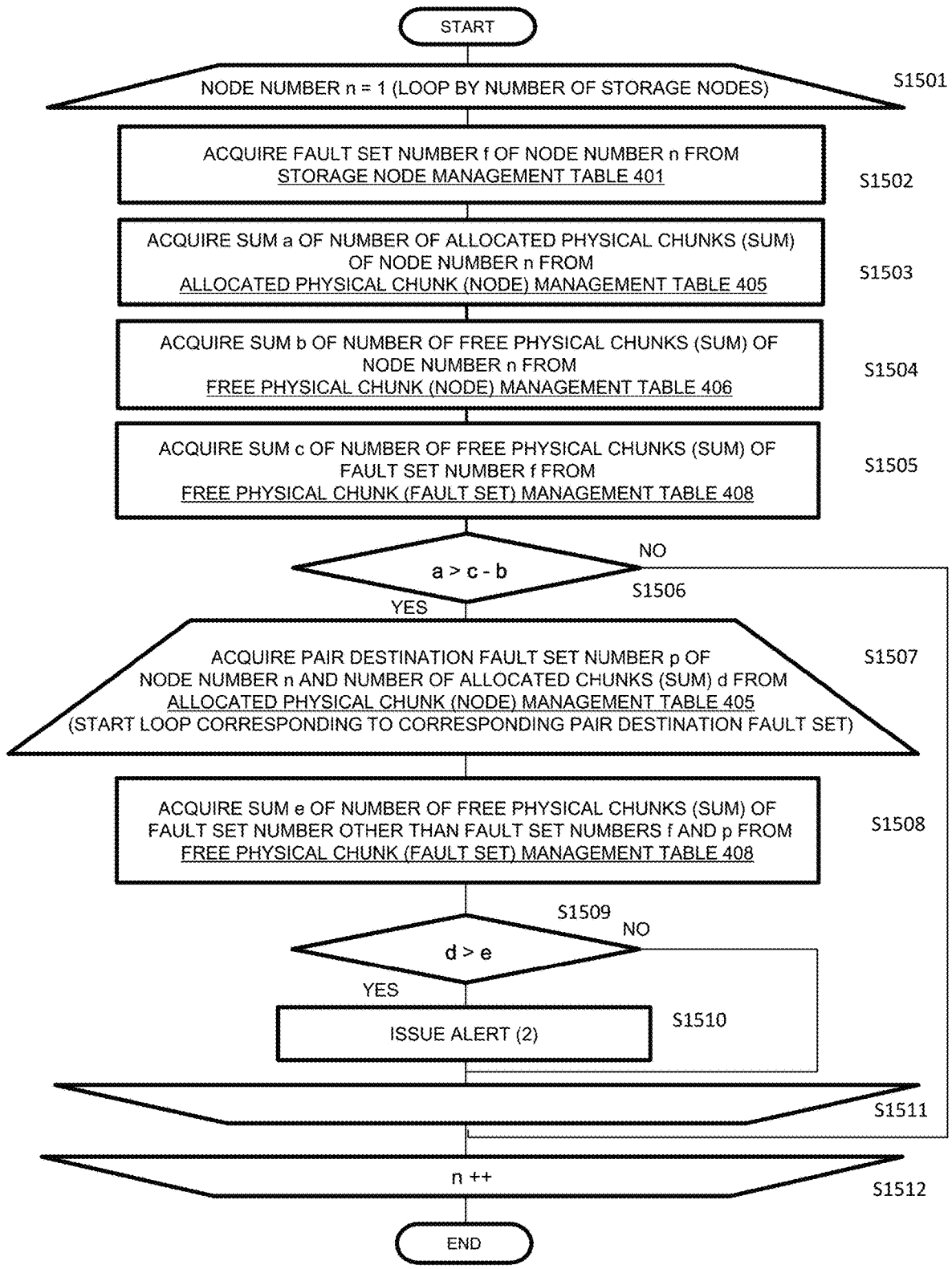
FIG. 15 is a flowchart illustrating a confirmation process flow of a notification condition (2) of the present embodiment.
Figure 16:
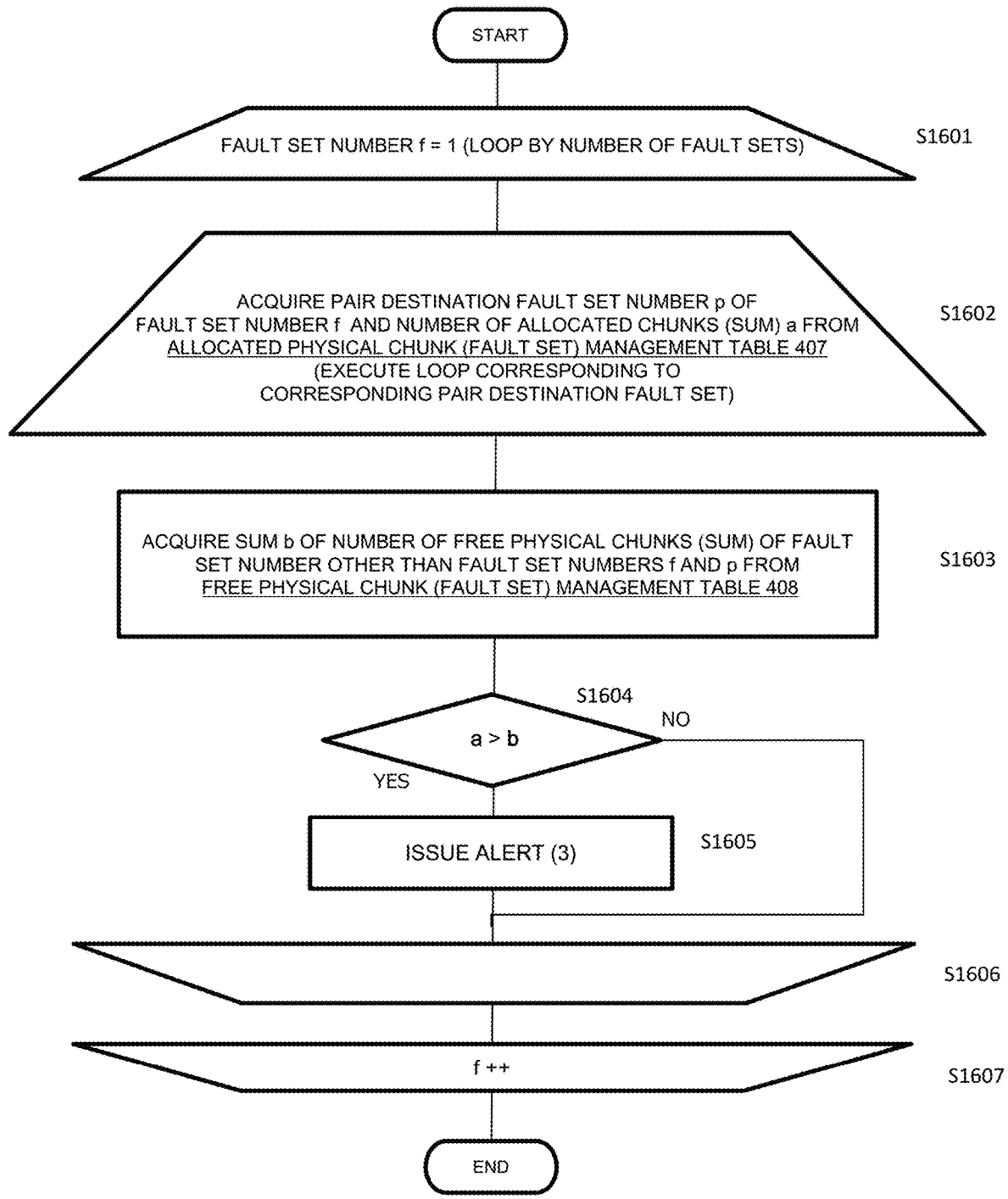
FIG. 16 is a flowchart illustrating a confirmation process flow of a notification condition (3) of the present embodiment.

The control unit 201 (for example, the function according to the cluster control program) performs control such that confirmation of a notification condition (1) illustrated in FIG. 14 is performed (step S1302), confirmation of a notification condition (2) illustrated in FIG. 15 is performed (step S1303), confirmation of a notification condition (3) illustrated in FIG. 16 is performed (step S1303), and alerts (1) to (3) are notified of when the respective notification conditions are satisfied. Although the cluster control unit 111 is not illustrated in the detailed flow, alert cancellation is notified of when the condition is not satisfied by an action of the administrator (an increase in the physical free capacity). Also, although not illustrated in the detailed flow, when Tier of drive, that is, a type of drive such as SSD, SAS, or SATA is considered, "coincidence in medium type" is added as a condition.

FIG. 14 is a flowchart illustrating a confirmation process flow of the notification condition (1) of the present embodiment. The process illustrated in FIG. 14 is executed by the cluster control unit 111 and is a process of issuing the alert (1) since the notification condition (1) is satisfied when the allocated physical capacity of each drive exceeds the sum of the free physical capacities of other drives in the same node.

If various types of management information are updated in the SODB 110, the process is started. In step S1401, the node number n=1 is set, and a loop process from step S1401 to step S1408 is performed by the number of storage nodes.

In step S1402, the number of free physical chunks (sum) a of the node number n is acquired from the free physical chunk (node) management table 406. That is, when the node number is 1, the number of physical chunks (sum) a "30" is acquired from the number of physical chunks (sum) 1002.

In step S1403, a drive number d connected to the node number n is acquired from the drive management table 402. That is, the drive numbers "1, 2, and 3" are acquired from the node number "1" of the drive management table 402. A loop process of repeating the process from step S1403 to step S1407 by the number of drives is performed.

In step S1404, the number of physical chunks (allocated) b and the number of physical chunks (free) c of a drive d are acquired from the drive management table 402. For example, in the case of the process of the drive number "1" among the drive numbers "1, 2, and 3" acquired in step S1403, "5" is acquired from the column 604 of the drive management table 402 as the number of physical chunks (allocated) b of the drive number "1", and "5" is acquired from the column 605 of the drive management table 402 as the number of physical chunks (free) c.

In step S1405, it is determined whether or not a−c<b is satisfied. That is, it is determined whether or not the value obtained by subtracting the number of physical chunks (free) c of the drive acquired in step S1404 from the number of free physical chunks (sum) a of the node number n acquired in step S1402 is smaller than the number of physical chunks (allocated) of drive acquired in step S1404. This means that it is determined whether or not the allocated physical capacity of each drive exceeds the sum of the free physical capacities of other drives in the same node. That is, it is determined whether or not the number of allocated physical chunks (physical capacity) of a specific drive belonging to a specific storage node among a plurality of storage nodes exceeds the sum of the number of free physical chunks (physical capacity) not allocated to the logical chunks of other drives of the specific storage node. Since the physical chunk has a predetermined size, the number of physical chunks can be replaced with the physical capacity.

If the result of the determination in step S1405 is negative, the process proceeds to step S1407, and if the result of the determination in step S1405 is affirmative, the process proceeds to step S1406. In step S1406, the alert (1) is issued. The content of the alert (1) will be described in detail with reference to FIG. 17A, but in brief, content indicating an alert for urging the system administrator to add the drive since there is a shortage of physical chunks of the node is included.

If the process of the corresponding drive ends, the next drive is selected, and the process starting from step S1403 is repeated. Here, if the process of the drive number "1" among the drive numbers "1, 2, and 3" ends, the drive number "2" is selected, and the process is repeated until the process of the drive number "3" ends. If the process ends for all the drives, the process proceeds to step S1408, the next node is selected, and the process starting from step S1401 is repeated.

FIG. 15 is a flowchart illustrating a confirmation process flow of the notification condition (2) of the present embodiment. A process illustrated in FIG. 15 is executed by the cluster control unit 111 and is a process of issuing the alert (2) since the notification condition (2) is satisfied when the allocated physical capacity of each node exceeds the sum of the free physical capacities of the other nodes.

In step S1501, the node number n=1 is set, and a loop of repeating the process of steps S1501 to S1512 by the number of storage nodes is started.

In step S1502, a fault set number f of the node number n is acquired from the storage node management table 401. For example, when the node number n=1, the fault set number "1" is acquired from the fault set number 502 of the storage node management table 401.

In step S1503, a sum a of the number of allocated physical chunks (sum) of the node number n is acquired from the allocated physical chunk (node) management table 405. When the node number n=1, it is acquired from the number of allocated physical chunks (sum) 903 of the physical chunk (node) management table 405.

In step S1504, a sum b of the number of free physical chunks (sum) of the node number n is acquired from the free physical chunk (node) management table 406. When the node number n=1, the sum b of the number of free physical chunks (sum) is acquired from the number of free physical chunks (sum) 1002 of the free physical chunk (node) management table 406.

In step S1505, a sum c of the number of free physical chunks (sum) of the fault set number f is acquired from the free physical chunk (fault set) management table 408. For example, when the fault set number is "1", the sum c of the number of free physical chunks (sum) is acquired from the free physical chunk sum 1202 of the free physical chunk (fault set) management table 408.

In step S1506, it is determined whether or not a condition a>c−b is satisfied from "a" acquired in step S1503, "b" acquired in step S1504, and "c" acquired in step S1505. This is to determine whether or not an allocated physical capacity of a node belonging to a certain fault set exceeds the sum of the free physical capacities of other nodes. That is, it is determined whether or not the number of allocated physical chunks of a first storage node belonging to a certain fault set exceeds the sum of the number of physical chunks (the free physical capacity) not allocated to the logical chunks in the storage nodes other than the first storage node. Since the physical chunk has a predetermined size, the number of physical chunks can be replaced with the physical capacity.

When the determination of step S1506 is negative, the process proceeds to step S1512, the next node is selected, and the process starting from step S1501 is repeated. When the determination of step S1506 is affirmative, the process proceeds to step S1507.

In step S1507, a pair destination fault set number p of the node number n and the number of allocated chunks (sum) d are acquired from the allocated physical chunk (node) management table 405. The pair destination fault set number p is acquired from the pair destination fault set number 902 of the allocated physical chunk (node) management table 405, and the number of allocated chunks (sum) d is acquired from the number of allocated chunks (sum) 903. A loop corresponding to a corresponding pair destination fault set (from step S1507 to step S1511) is started.

In step S1508, a sum e of the number of free physical chunks (sum) of the fault set number other than the fault set numbers f and p is acquired from the free physical chunk (fault set) management table 408.

In step S1509, it is determined whether or not a condition of d>e is satisfied from the number of allocated chunks (sum) d acquired in step S1507 and the sum e of the number of free physical chunks (sum) of the fault set number acquired in step S1508. That is, in step S1509, it is determined whether or not the allocated physical capacity of each node of the pair destination fault set exceeds the sum of the free physical capacities of the other nodes. Since the physical chunk has a predetermined size, the number of physical chunks can be replaced with the physical capacity. Here, in the other nodes, nodes belonging to the fault set which is in process and the pair destination fault set are excluded.

When the condition of step S1509 is not satisfied, the process proceeds to step S1511, and the process starting from step S1507 is repeated for the next pair destination fault set of the node number n.

When the condition of step S1509 is satisfied, the process proceeds to step S1510, and the alert (2) is issued. The details of alert (2) will be described with reference to FIG. 17B, but in brief, an alert for urging the system administrator to add the physical capacity or an alert for urging the system administrator to add the physical capacity to the fault set other than the fault set paired with the fault set since there is a shortage of physical chunks of the fault set is notified of. Here, the addition of the physical capacity is performed by adding the drive or the node. Further, the minimum capacity of the physical capacity to be added is also notified of.

Then, in step S1511, when the process ends for the pair destination fault set number p of the node number n acquired in step S1507, the next fault set is selected (step S1508), and the loop process is repeated.

If the process ends for all the pair destination fault set numbers of the node number n, the next node is selected in step S1512, and the loop process is repeated.

FIG. 16 is a flowchart illustrating a confirmation process flow of the notification condition (3) of the present embodiment. The process illustrated in FIG. 16 is executed by the cluster control unit 111, and is a process of issuing the alert (3) since the notification condition (3) is satisfied when the allocated physical capacity of each fault set exceeds the sum of the free physical capacities of other fault sets. Here, for the other fault sets, both the fault set which is in process and the pair destination fault set are excluded.

In step S1601, the fault set number f=1 is selected, and the loop process to step S1607 is started by the number of fault sets.

In step S1602, the pair destination fault set number p of the fault set number f and the number of allocated chunks sum a are acquired from the allocated physical chunk (fault set) management table 407. The value of the pair destination fault set number 1102 of the allocated physical chunk (fault set) management table 407 is used as the pair destination fault set number p, and the value of the number of allocated chunks (sum) 1103 is used as the number of allocated chunks (sum) a. A loop corresponding to a corresponding pair destination fault set from step S1602 to step S1606 is executed.

In step S1603, the sum b of the number of free physical chunks (sum) of the fault set number other than the fault set numbers f and p is acquired from the free physical chunk (fault set) management table 408. The value of 1202 of the free physical chunk (fault set) management table 408 is used as the value of b.

In step S1604, a>b is determined. That is, it is determined whether or not the number of allocated chunks (sum) a acquired in step S1602 is larger than the sum b of the number of free physical chunks (sum) of the fault set number other than the fault set numbers f and p acquired in step S1603. This process is to determine whether or not the allocated physical capacity of the fault set exceeds the sum of free physical capacities of other fault sets except for the pair destination fault set of data. That is, it is determined whether or not the number of allocated physical chunks of a storage node belonging to a second fault set exceeds the sum of the number of physical chunks (the free physical capacity) which belong to the storage nodes belonging to the second fault set and the fault set other than the fault set paired with the second fault set and are not allocated to the logical chunks. Here, since the physical chunk has a predetermined size, the number of physical chunks can be replaced with the physical capacity.

When the determination in step S1604 is negative, the process proceeds to step S1606, the pair destination fault set number p is incremented, the next pair destination fault set number is selected, and the loop process is executed.

When the determination in step S1604 is affirmative, the process proceeds to step S1605, and the alert (3) is issued. The details of the alert (3) will be described with reference to FIG. 17C, but in brief, content indicating an alert for urging the system administrator to add a drive because there is a shortage of physical chunks of other fault sets is included.

FIG. 17A is a diagram illustrating an example of the alert (1) according to the notification condition (1) of the present embodiment.

In a case in which the notification condition (1) such as a condition that the allocated physical capacity of each drive exceeds the sum of the free physical capacities of other drives in the same node is satisfied, a notification of the alert (1) illustrated in FIG. 17A is given to the system administrator.

The content of the alert (1) is as follows:
"Please add drive whose physical capacity sum is equal to or larger than "b−(a−c)" to node of node number n.
I/O performance is likely to degrade as compared with normal times at time of data rebuilding by removal or failure of drive in node with node number n".

In other words, it is possible to give a notification indicating a minimum physical capacity required for rebuilding data stored in the node to the node in which the notification condition has been determined, in addition to the addition of the physical capacity. As the physical capacity to be actually added, a physical capacity of a value larger than the minimum required physical capacity, for example, 1.5 times the minimum required physical capacity may be added. The administrator appropriately sets how much the physical capacity is to be added more than the minimum required physical capacity.

In FIG. 17A, the administrator is also notified of influence on the I/O performance associated with the data rebuilding executed on the node number n.

FIG. 17B is a diagram illustrating an example of the alert (2) according to the notification condition (2) of the present embodiment.

In a case in which the notification condition (2) such as a condition that the number of allocated physical chunks of a first storage node belonging to a certain fault set exceeds the sum of the number of physical chunks (the free physical capacity) which belong to a certain fault set and are not allocated to the logical chunks in a storage node other than the first storage node or a condition that the allocated physical capacity of each node of the pair destination fault set exceeds the sum of the free physical capacities of the other nodes is satisfied, a notification of the alert (2) illustrated in FIG. 17B is given to the system administrator.

The content of the alert (2) is as follows:

"Please add a node or a drive whose physical capacity sum is equal to or larger than "a−(c−b)" to fault set of fault set number f.

Or please add node or drive whose physical capacity sum is equal to or larger than "d−e" to fault set of fault set number other than fault set numbers f and p.

When node of node number n is blockaded, data of node may not be able to be rebuilt".

In other words, it is possible to give a notification indicating a minimum physical capacity required for rebuilding data stored in the node to the fault set in which the notification condition has been determined, in addition to the addition of the physical capacity. A notification indicating that the addition of the physical capacity can be achieved by addition of a node or a drive having a necessary physical capacity is also given.

Also, a notification indicating the addition of the physical capacity and the physical capacity necessary for rebuilding is given to the fault sets other than the fault set paired with the fault set. A notification indicating that the addition of the physical capacity can be achieved by addition of a node or a drive having a necessary physical capacity is also given.

As the physical capacity to be actually added, a physical capacity of a value larger than the minimum required physical capacity, for example, 1.5 times the minimum required physical capacity may be added. The administrator appropriately sets how much the physical capacity is to be added more than the minimum required physical capacity.

In FIG. 17B, when the node of the node number n is blockaded, an alert indicating that rebuilding of data of the node may not be able to be performed is also notified of.

FIG. 17C is a diagram illustrating an example of the alert (3) according to the notification condition (3) of the present embodiment.

In a case in which the notification condition (3) such as a condition that the allocated physical capacity of each node exceeds the sum of the free physical capacities of other nodes except the node belonging to the pair destination fault set of data, a notification of the alert (3) illustrated in FIG. 17C is given to the system administrator.

The content of the alert (3) is as follows:

"Please add node or drive whose physical capacity sum is equal to or larger than "a−b" to fault set of fault set number other than fault set numbers f and p.

When fault set of fault set number f is blockaded, data of fault set may not be able to be rebuilt".

In other words, it is possible to give a notification indicating addition of a minimum physical capacity required for rebuilding data stored in the fault set to the fault set other than the fault set paired with the fault set in which the notification condition has been determined, in addition to the addition of the physical capacity. A notification indicating that the addition of the physical capacity can be achieved by addition of a node or a drive having a necessary physical capacity is also given.

As the physical capacity to be actually added, a physical capacity of a value larger than the minimum required physical capacity, for example, 1.5 times the minimum required physical capacity may be added. The administrator appropriately sets how much the physical capacity is to be added more than the minimum required physical capacity.

As described above, when the physical capacity for rebuilding is insufficient, the system administrator can understand a place and an amount of the physical capacity to be added through the alerts (1) to (3).

That is, on the basis of the alerts (1) to (3), the system administrator can understand a place to which the physical capacity is to be added, for example, can understand whether to (i) add the physical capacity to the same node, (ii) add the physical capacity to the node belonging to the same fault set or add a node to the same fault set, or (iii) add the physical capacity to the node belonging to another fault set which does not store the redundant data or add a node.

Also, it is possible to understand the amount of the physical capacity to be added to the place to which the physical capacity is to be added.

Figure 18:
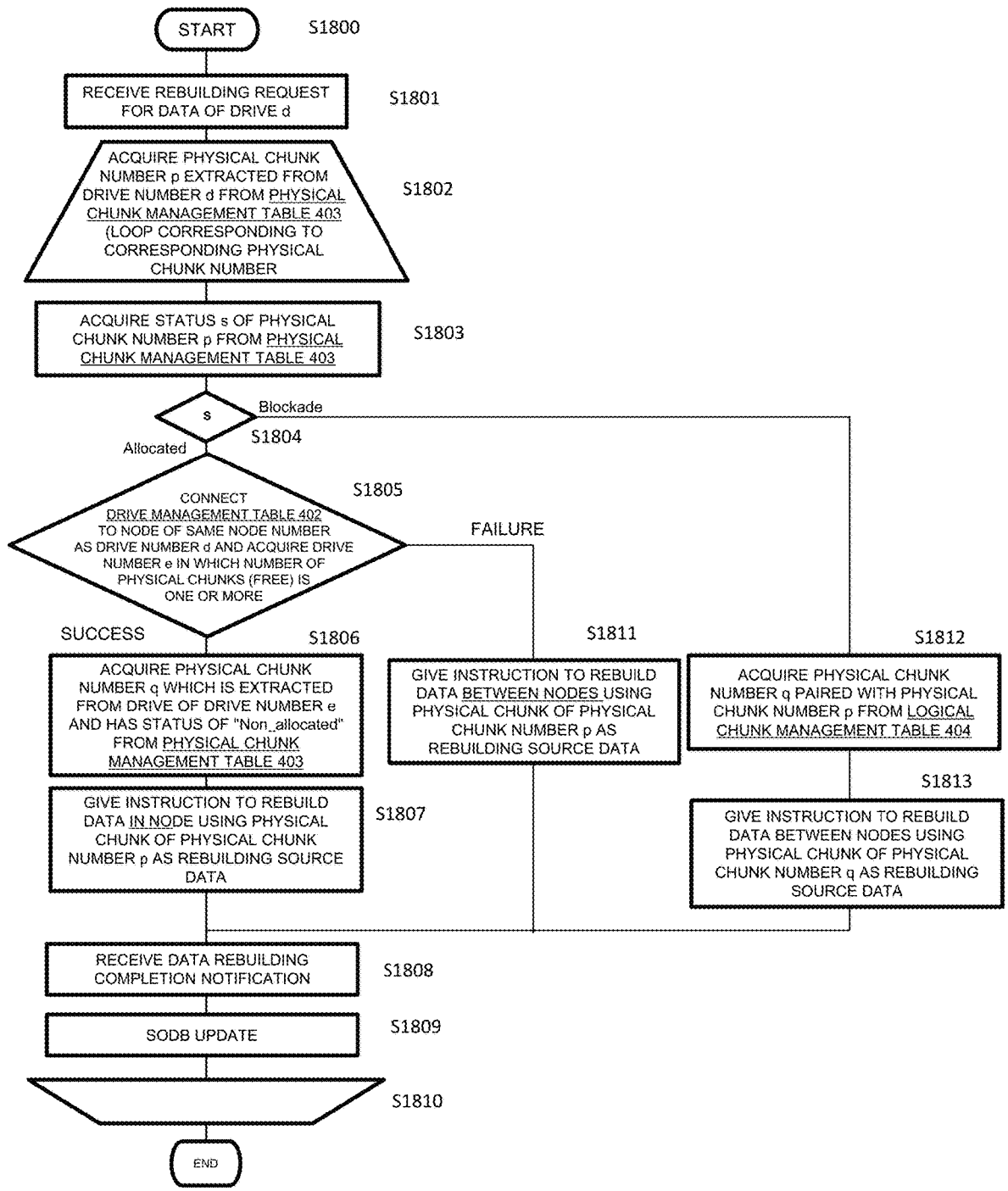
FIG. 18 is a flowchart illustrating an intra-node priority allocation process of the present embodiment.

FIG. 18 is a flowchart illustrating an intra-node priority allocation process of the present embodiment.

In step S1801, a rebuilding request for the data of the drive d is received.

In step S1802, the physical chunk number p extracted from the drive number d is acquired from the physical chunk management table 403. A process of steps S1803 to S1810 is a loop for repeating the process corresponding to a corresponding physical chunk number.

At step S1803, a status s of the physical chunk number p is acquired from the physical chunk management table 403.

When the status of the physical chunk number acquired in step S1803 is "Allocated" in step S1804, the process proceeds to step S1805, and when the status is "Blockade", the process proceeds to step S1812.

In step S1805, the drive management table 402 is connected to the node of the same node number as the drive number d, and a drive number e in which the number of physical chunks (free) is one or more is acquired.

When the drive number e is successfully acquired in step S1805, the process proceeds to step S1806, and when the acquisition fails, the process proceeds to step S1811.

In step S1806, a physical chunk number q which is extracted from the drive of the drive number e and has a status of "Non_allocated" is acquired from the physical chunk management table 403.

In step S1807, an instruction to rebuild data in the node is given using the physical chunk of the physical chunk number p as rebuilding source data.

If the acquisition of the drive number e fails in step S1805, in step S1811, an instruction to rebuild data between nodes is given using the physical chunk of the physical chunk number p as the rebuilding source data.

In step S1804, it is determined to be "Blockade", the process proceeds to step S1812, and the physical chunk number q paired with the physical chunk number p is acquired from the logical chunk management table.

Then, in step S1813, an instruction to rebuild data between nodes is given using the physical chunk of the physical chunk number q as the rebuilding source data.

If a data rebuilding completion notification is received in step S1808, various types of table information is updated to reflect content after the data rebuilding (step S1810).

Since storing rebuilding data of data stored in the drive d in the drive of the same node is performed with a priority through the process of FIG. 18, it is possible to suppress data transfer for data rebuilding that occurs between nodes and achieve faster data rebuilding and suppress the degradation in the I/O performance of the system.

As described above, according to the present embodiment, it is possible to perform the capacity management for the data rebuilding in units of drives, in units of nodes, or in units of fault sets in order to secure the data redundancy even when a drive or a node has a failure or when a drive or a node is removed in a multi-storage node system.

Further, the system administrator can understand the shortage of the physical capacity of the storage destination of the rebuilt data and easily understand how much the physical capacity is to be added.

What is claimed is:

1. A multi-storage node system, comprising:
a plurality of storage nodes,
wherein the plurality of storage nodes each includes a plurality of drives that store data and a control unit that controls writing of data to the plurality of drives,
the control unit divides storage areas of the plurality of drives into a plurality of physical chunks, allocates the divided physical chunks to logical chunks, and stores data,
the plurality of storage nodes are divided into fault sets affected by a single failure, and
the control unit of one primary node that manages the multi-storage node system among the plurality of storage nodes includes a database for managing allocation of the physical chunks of the plurality of storage nodes to the logical chunks for each drive, each storage node, or for each fault set,
wherein the control unit of the primary node
determines whether or not the number of allocated physical chunks of a first drive in a first storage node among the plurality of storage nodes exceeds a sum of the number of unallocated free physical chunks in drives in the first storage node other than the first drive in the first storage node, and
gives an alert for adding another drive, having a number of free physical chunks equal to or larger than the sum of the number of unallocated free physical chunks, to the first storage node when exceeded.

2. The multi-storage node system according to claim 1, wherein the database includes a drive management table for managing the number of physical chunks, the number of physical chunks allocated to the logical chunks, and the number of physical chunks not allocated to the logical chunks for each drive.

3. The multi-storage node system according to claim 2, wherein the database includes
an allocated physical chunk (node) management table for managing the number of physical chunks allocated to logical chunks as the number of allocated chunks for each storage node, and
a free physical chunk (node) management table for managing the number of physical chunks not allocated to logical chunks as the number of free physical chunks for each storage node.

4. The multi-storage node system according to claim 3, wherein the database includes
an allocated physical chunk (fault set) management table for managing the number of physical chunks allocated to the logical chunks as the number of allocated chunks for each fault set, and
a free physical chunk (fault set) management table for managing the number of physical chunks not allocated to logical chunks as the number of free physical chunks for each fault set.

5. The multi-storage node system according to claim 4, wherein the allocated physical chunk (node) management table and the allocated physical chunk (fault set) management table manage the number of allocated physical chunks for each type of the drive, and
the free physical chunk (node) management table and the free physical chunk (fault set) management table manage the number of physical chunks not allocated to the logical chunks for each type of the drive.

6. The multi-storage node system according to claim 1, wherein the control unit of the primary node
determines whether or not the number of allocated physical chunks of the first storage node belonging to a first fault set among the plurality of storage nodes exceeds a sum of the number of physical chunks not allocated to the logical chunks in a storage node other than the first storage node belonging to the first fault set, and
gives an alert for adding the number of free physical chunks to the first fault set when exceeded.

7. The multi-storage node system according to claim 6, wherein the control unit of the primary node
determines whether or not the number of allocated physical chunks of a storage node belonging to a second fault set among the plurality of storage nodes exceeds a sum of the number of physical chunks not allocated to the logical chunks in a storage node belonging to a fault set other than the second fault set, and
gives an alert for adding the number of free physical chunks to the fault set other than the second fault set when exceeded.

8. A capacity management method of a multi-storage node system including a plurality of storage nodes,
the plurality of storage nodes including a plurality of drives that store data and a control unit that controls writing of data to the plurality of drives, the capacity management method comprising:
dividing, by the control unit, storage areas of the plurality of drives into a plurality of physical chunks, allocating the divided physical chunks to logical chunks, and storing data;
dividing the plurality of storage nodes into fault sets affected by a single failure; and
managing, by the control unit of one primary node that manages the multi-storage node system among the plurality of storage nodes, allocation of the physical chunks of the plurality of storage nodes to the logical chunks for each drive, each storage node, or for each fault set by a database,
wherein the control unit of the primary node
determines whether or not the number of allocated physical chunks of a first drive in a first storage node among the plurality of storage nodes exceeds a sum of the number of unallocated free physical chunks in drives in the first storage node other than the first drive in the first storage node, and gives an alert for adding another drive, having a number of free physical chunks equal to or larger than the sum of the number of unallocated free physical chunks, to the first storage node when exceeded.

9. The capacity management method of the multi-storage node system according to claim 8, wherein the database includes a drive management table for managing the number of physical chunks, the number of physical chunks allocated to the logical chunks, and the number of physical chunks not allocated to the logical chunks for each drive.

10. The capacity management method of the multi-storage node system according to claim 9, wherein the database includes an allocated physical chunk (node) management table for managing the number of physical chunks allocated to logical chunks as the number of allocated chunks for each storage node, and a free physical chunk (node) management table for managing the number of physical chunks not allocated to logical chunks as the number of free physical chunks for each storage node.

11. The capacity management method of the multi-storage node system according to claim 10, wherein the database includes an allocated physical chunk (fault set) management table for managing the number of physical chunks allocated to the logical chunks as the number of allocated chunks for each fault set, and a free physical chunk (fault set) management table for managing the number of physical chunks not allocated to logical chunks as the number of free physical chunks for each fault set.

12. The capacity management method of the multi-storage node system according to claim 8, wherein the control unit of the primary node determines whether or not the number of allocated physical chunks of the first storage node belonging to a first fault set among the plurality of storage nodes exceeds a sum of the number of physical chunks not allocated to the logical chunks in a storage node other than the first storage node belonging to the first fault set, and gives an alert for adding the number of free physical chunks to the first fault set when exceeded.

13. The capacity management method of the multi-storage node system according to claim 12, wherein the control unit of the primary node determines whether or not the number of allocated physical chunks of a storage node belonging to a second fault set among the plurality of storage nodes exceeds a sum of the number of physical chunks not allocated to the logical chunks in a storage node belonging to a fault set other than the second fault set, and gives an alert for adding the number of free physical chunks to the fault set other than the second fault set when exceeded.

* * * * *